April 7, 1953 R. B. BLAND 2,634,337

COMBINED MICROPHONE AND RECEIVER FOR AUDIPHONES

Filed Dec. 5, 1947 2 SHEETS—SHEET 1

INVENTOR.
Reginald B. Bland
BY
Watson, Cole, Grindle & Watson
ATTORNEYS

April 7, 1953 R. B. BLAND 2,634,337

COMBINED MICROPHONE AND RECEIVER FOR AUDIPHONES

Filed Dec. 5, 1947 2 SHEETS—SHEET 2

INVENTOR.
Reginald B. Bland

BY Watson, Cole, Grindle & Watson
ATTORNEYS

Patented Apr. 7, 1953

2,634,337

UNITED STATES PATENT OFFICE 2,634,337

COMBINED MICROPHONE AND RECEIVER FOR AUDIPHONES

Reginald B. Bland, Newport News, Va.

Application December 5, 1947, Serial No. 790,003

14 Claims. (Cl. 179—107)

This invention relates to audiphones and the object of the invention is to prevent the audiphone from singing when operating at high gain with the pick-up transmitter close to the receiver.

It has been suggested heretofore to form a compact audiphone unit to be held in position at the ear of the user by placing the pick-up transmitter and the audiphone receiver in a single casing. Many advantages over the conventional audiphone units are obtained by removing the pick-up transmitter from the amplifier unit where it is normally located and placing it with the receiver at the ear of the user. Some of these are elimination of clothing noise, the elimination of the necessity of special corrective features in the amplifier circuits to correct for the "baffle" effect of the body and the selective absorption of certain frequencies by the body clothing, and the obtaining of a limited sense of direction by the user which is entirely lacking where the mircophone pick-up is carried at some part of the body remote from the ear.

The unit of the audiphone, however, that is carried at the ear of the user must of necessity be small, so as not to be too conspicuous, and light in weight, as it is normally supported solely by the ear of the user. In modern audiphone practice, an amplifier is ordinarily used between the transmitter and receiver and, since the gain used is at times quite high, special precautions must be taken in order to prevent singing caused by acoustic or other feed-back coupling between the sound pick-up transmitter and the receiver.

Where the sound pick-up transmitter and the receiver are both mounted in a single casing and the whole unit is of a size sufficiently small to be practical the problem of singing caused by feed-back from the receiver to the sound pick-up becomes particularly acute, especially where high gains are necessary. This feed-back, which is characterized by a continuous whistling or singing sound of more or less fixed pitch, results as a consequence of the introduction of exciting forces on the diaphragm or pressure-sensitive element of the microphone which are translated into fluctuating electric currents which in turn are amplified, and fed to the receiver where they cause the diaphragm of the receiver to vibrate. Part of the vibrating forces thus generated in the receiver feed back through various paths to the diaphragm of the pick-up transmitter, and when this occurs an unstable condition exists and the exciting forces build up until the amplifier is overloaded and further increase becomes impossible. One of the main paths whereby vibrations of the receiver elements are fed back to the diaphragm of the pick-up receiver in small, compact, combined transmitter-receiver units is through the case itself, the case being caused to vibrate under the inertia forces due to the vibration of the receiver diaphragm. This vibration of the case imposes vibrating forces on the diaphragm or pressure-sensitive element of the pick-up transmitter both by imposing inertia forces directly on the pick-up receiver elements and by transmitting its motion to the air from whence it is picked up by the transmitter.

According to the present invention, the receiver elements are so formed that the inertia forces on the receiver are either caused to substantially cancel each other or to produce a force couple tending to give the case a rotary rather than a reciprocating movement thus greatly reducing the feed-back normally caused by axial vibration of the case. This prevents the casing from acting as a rigid piston that is vibrating axially at a small amplitude and transmitting its motion to the air from whence it can be picked up by the pick-up transmitter. The receiver element is also mounted in a novel and efficient manner transversely in the case so as to substantially eliminate any vibrations from the receiver diaphragm and diaphragm actuator being transmitted to the receiver casing from whence they could be picked up by the pick-up transmitter.

Referring to the drawings.

Figures 5, 6, 7:
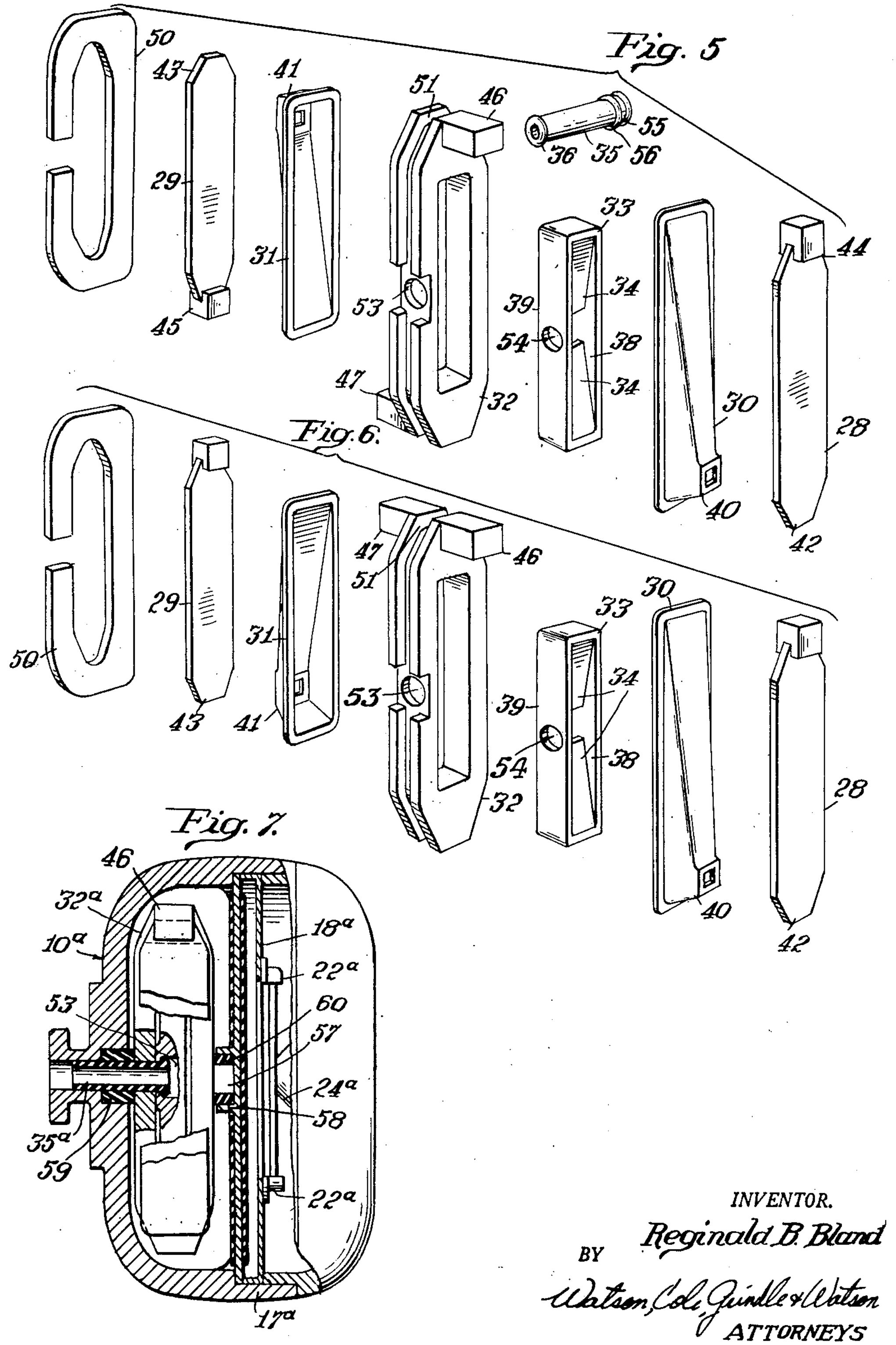
Figure 5 is an exploded view of the receiver, separately showing its various component parts.
Figure 6 is a view similar to Figure 5 showing a modified form of receiver.
Figure 7 is a sectional view through a receiver embodying the invention, which receiver has a mounting means of a type different from that incorporated in other embodiments.
Figure 1:
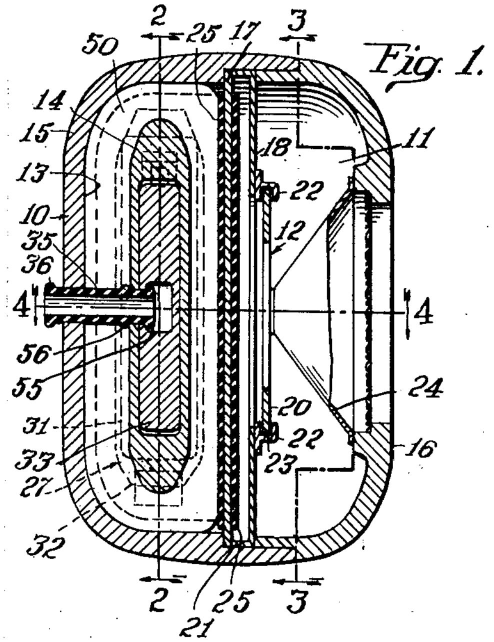
Figure 1 is a cross-section taken through the center of a combination pick-up transmitter and receiver unit embodying my invention.
Figure 2:
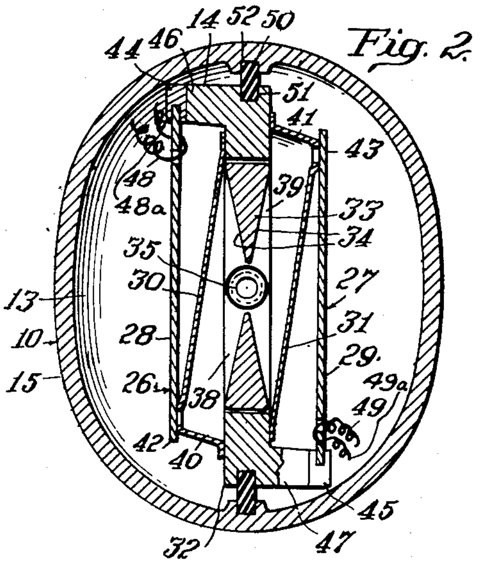
Figure 2 is a section taken on line 2—2 of Figure 1.
Figure 3:
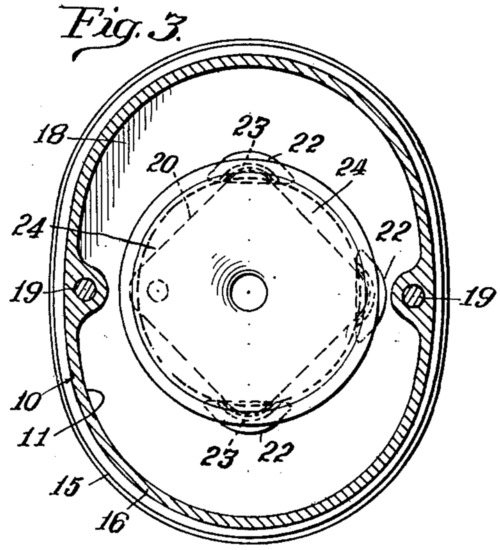
Figure 3 is a section taken on line 3—3 of Figure 1.
Figure 4:
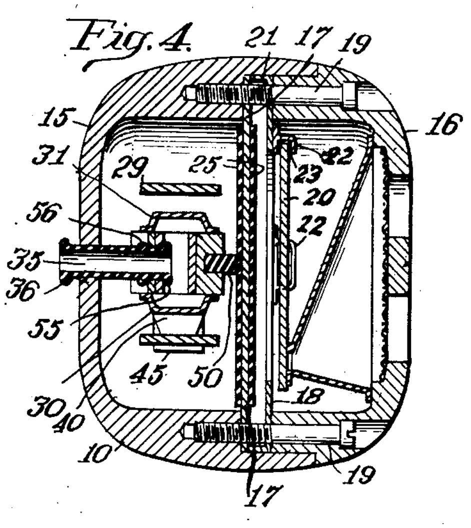
Figure 4 is a section taken on line 4—4 of Figure 1.

In the receiver shown in Figures 1 through 6, the casing 10 is shown to define a chamber 11 for the pick-up transmitter 12 and a chamber 13 for the receiver 14. The casing 10 is shown as comprising two separately formed cup-shaped portions 15 and 16 fitted together and securely holding in place a septum 17 and a supporting ring 18. Any conventional means can be used to hold the two mating portions together, screws 19 being used in the embodiments shown.

The ring 18, which supports the vibrating element 20 of the pick-up transmitter 12 is formed with a flange 21 extending around its outer edge which serves to space the face of the ring 18 from the septum 17. The vibratory element 20 of the pick-up receiver may be of any known type. It is preferred, however, to use a piezo-electric crystal vibrator of the type now used in hearing aids. The crystal element 20 is resiliently mounted at three corners in brackets 22 carried by the supporting ring 18 the brackets being lined with a suitable resilient material 23. To the fourth, or free corner of the crystal 20 is secured the apex of a cone-shaped diaphragm 24 the base of which is secured, by some suitable cement, to the interior of the casing half 16.

The septum 17 dividing the case 10 into two chambers 11 and 13 is preferably coated on both sides with sponge rubber 25 or some other material which will tend to damp out vibrations in the audible range to prevent the septum itself from transmitting vibrations from the receiver chamber 13 to the pick-up transmitter chamber 11 where its vibrations might act on the crystal 20 or the diaphragm 24.

The receiver is a dual receiver formed of two separate receiver units 26 and 27 the crystals 28 and 29 of which are so connected through leads 48, 48*a*, 49 and 49*a* to the output of the amplifier unit, not shown, that they vibrate in phase with each other, that is that, by appropriate juxtaposition of the leads 48, 48*a*, and of the leads 49, 49*a* as regards their polarity with respect to the polar characteristics of the crystals 28 and 29 respectively, they are caused to warp toward and away from each other at the same time. The receiver 14 can more clearly be described by referring to Figures 5 and 6 where the various elements from which the dual receiver is formed are shown in detail, the only difference between these figures being the positioning of the individual receiver units with respect to each other.

The receiver as shown employs two bi-morph-piezo-electric crystals 28 and 29 each of which is trimmed to a tubular shape and each of which drives a pyramidal diaphragm 30 and 31. The crystals 28, 29 and diaphragms 30, 31 are mounted transversely with respect to the directional axis of the vibration sensitive elements of the sound pick-up transmitter 12 on the opposite sides of a receiver body 32 into the interior of which is inserted a plenum chamber 33. The plenum chamber 33 serves to collect the sound and concentrate it through the use of sloping walls 34 into a sound tube 35 which provides an air passage from the plenum chamber to the outside of the casing. The outer end of the tube 35 is formed with a raised ridge 36 so that an ear piece, not shown, can be snapped onto the tube end. The diaphragms 30 and 31 are secured to each side of the receiver body 32 by cementing their edges which are flexible, to the receiver body, the diaphragms so disposed as to cover the openings 38 and 39 in the sides of the plenum chamber. The small ends 40 and 41 of the diaphragms 30, 31 are cemented to the free ends 42, 43 of the crystal elements 28, 29. The other ends 44, 45 of the crystals are secured to projections 46 and 47 formed on either side of the receiver body 32. The crystals are connected to an amplifier unit, not shown, through leads 48, 48*a*, 49 and 49*a* with electrical polarities arranged in such manner that the operating voltage imposed on the respective crystals are in phase so as to cause the crystals to vibrate in phase with each other in response to voltage fluctuations transmitted from the amplifier. The crystals are thus caused to move toward and away from the receiver body in unison. This vibratory motion of the crystals is transmitted to the diaphragms 30, 31 which alternately cause the air within the plenum chamber 33 to be compressed and rarefied, thus sending a series of sound waves out through the sound tube 35. Phase relationship is herein defined with respect to a coordinate system passing through the axis of symmetry of the receiver body.

In the arrangement of elements shown in Figure 5 it will be noted that the crystal vibrator 28 and diaphragm 30 on one side of the receiver body are turned 180° with respect to the diaphragm 31 and the associated crystal vibrator 29 on the other side of the receiver body. With such an arrangement of the vibrating elements of the receiver, the inertia forces acting at the crystal attachments 46 and 47 are such as to produce a force couple tending to give a rotary oscillatory movement to the receiver body 32 and its associated elements about an axis passing through the sound tube 35, and hence transversely with respect to the directional axis of the vibration sensitive elements of the sound pick-up transmitter 12, rather than a reciprocatory axial movement as with the conventional receiver structure. This is desired since it substantially eliminates any of the inertia forces setting up vibratory forces parallel to the sound tube 35, which forces would give to the case 10 a reciprocating vibratory axial motion which, as previously stated, is highly objectionable since it tends to transmit sound waves to the air which can then be picked up by the pick-up transmitter.

Figure 6 shows a different embodiment of receiver from that shown in Figure 5 and described above. Both embodiments consist of identical elements and have the basic feature that the receiver is made up of two separate receiver elements so coupled as to have a common output impedance and both embodiments, by being assembled and arranged transversely with respect to the transmitter axis, substantially eliminate any reciprocating axial motions which may possibly be transmitted to the receiver case. The main difference between the embodiments illustrated in Figures 5 and 6 is that the receiver elements of each of the individual receiver units 26 and 27 in the embodiment illustrated in Figure 5 are so mounted with respect to each other that the inertia forces of the crystal elements 28 and 29 form a couple tending to rotate the receiver body 32 about an axis which would pass through sound tube 35 whereas in the embodiment of Figure 6 the receiver elements of the dual receiver units 26 and 27 are so mounted with respect to each other that the inertia forces due to one substantially cancel out the inertia forces due to the other.

Referring more particularly to Figure 6, it will be noted that the raised portions 46 and 47 on the opposed sides of the receiver body 32 are placed directly opposite each other and that the crystals 28 and 29 and diaphragms 30 and 31 are so positioned with respect to each other that one is substantially the mirror image of the other. With the crystal and diaphragm elements of the dual receiver so arranged, and designed so as to have substantially the same characteristics, any inertia forces originating from one will be substantially cancelled out by the opposed inertia forces originating from the other. This substantially eliminates the possibility of any inertia forces, due to receiver operation, being transmitted to the receiver casing, especially in view of the above described arrangements of the receiver elements transversely with respect to the axis of the transmitter elements.

The receiver body 32 is resiliently mounted in the casing 10 by means of a flat washer-like slit ring 50 the edges of which are adapted to fit respectively into a groove 51 extending around the outer peripheral edge of the receiver body 32 and a groove or channel 52 formed on the inner surface of the receiver casing. In order to symmetrically mount the receiver 14, the ring 50 should be so positioned as to lie in a plane passing substantially through the center of gravity of the assembled receiver 14. In order to insure against accidental displacement of the receiver some suitable cement is used to maintain the edges of the supporting ring 50 in the respective grooves 51 and 52. The portion of the sound tube 35 which passes through the openings 53 and 54, in the receiver body 32 and the plenum chamber 33, is preferably formed with a smaller diameter than the openings 53 and 54 so as to permit relative rotary movement between the receiver body and the tube. This is desirable, particularly in the embodiment shown in Figure 5, since the oscillating rotary movement of the receiver body 32 should preferably not be transmitted to the sound tube 35 which, in the form shown in Figure 5, is rigidly secured to the receiver casing. In order to prevent leakage of air between the sound tube and the receiver body resilient seals 55 and 56 are provided.

A different method of mounting the receiver body in the case is shown in Figure 7 wherein the receiver is supported through the sound tube 35*a* and a projection formed on the receiver body. In this form the receiver body 32*a* is slightly modified by having formed thereon a short shaft 57 which extends from its edge opposed to the sound tube opening 53 and in alignment therewith. The septum 17*a* is also modified so as to have a cylindrical extension 58 formed thereon and adapted to receive the shaft 57. In this embodiment the sound tube 35*a* is rigidly secured at one end to the receiver body and has the other end loosely fitted in the casing 10*a* where it is supported and secured to the casing through a resilient bushing member 59. The shaft 57 is also resiliently supported through the use of a resilient bushing 60 which is interposed between the shaft 57 and the cylindrical extension 58 carried by the septum. The sound tube 35*a* and the shaft 57 should be so disposed with respect to the receiver as to lie in a plane passing substantially through the center of gravity of the receiver 14.

It will be readily apparent that by the use of either method of mounting the receiver body 32 in the casing 10, the receiver body and its associated elements are completely separated from any direct contact with the casing by a cushioning and vibration damping material and at the same time the mountings are such as to permit a slight rotary oscillating movement of the receiver body and its associated elements to occur relative to the casing about an axis passing through the sound tube without transmitting any substantial amount of said movement to the casing itself, and, most importantly, minimizing any axially directed inertia forces.

With the construction shown, various modifications can be made to the diaphragms, to the plenum chamber and to the sound tube, if desired, to permit cavity resonance and thus produce a highly peaked acoustic output. The frequency and breadth of the response peak can also be pre-selected by a suitable choice of the dimensions of these elements and the materials of which they are formed. It is also pointed out that various changes in the details of the structure shown in the preferred embodiments as set forth in the drawings may be made without departing from the spirit or scope of the invention as set forth in the appended claims such for example as forming the plenum chamber directly in the receiver body rather than as a separate item as shown in the drawings, by using magnetic rather than crystal vibrating elements or by varying the shape or structure of the various component elements such as vibrating elements, receiver body, receiver diaphragm, etc.

Having thus described the invention, what is claimed as new and desired to be secured by Letters Patent is:

1. In an audiphone receiver, a casing, a receiver body supported in said casing, a yielding support for said receiver body to permit slight relative movement between said receiver body and said casing, said yielding support comprising a flat ring formed of resilient material, said receiver body having a channel extending around its peripheral edge into which the inner edge of said ring is inserted, the interior of said casing having a channel into which the outer edge of said ring is inserted to support said receiver body in spaced relationship with respect to said casing, a plenum chamber in said receiver body having an opening on either side thereof, individual receiver units mounted on each side of said receiver body comprising each a diaphragm and a crystal diaphragm actuator, each of said diaphragms covering one of said openings in said plenum chamber, projections on said receiver body adjacent said openings for mounting said crystal actuators, and a sound tube extending through said casing and receiver body and into said plenum chamber to provide a fluid passage from the interior of said plenum chamber to the exterior of said casing.

2. In an audiphone, a casing, a septum supported within and dividing said casing, a microphone supported within one portion of said casing, a receiver body supported within another portion of said casing and separated from said microphone by said septum, a plenum chamber within said receiver body, an air passage extending from the exterior of said casing into said plenum chamber, a pair of individual receiver units mounted on said receiver body in opposed position with respect to each other, both individual receiver units likewise being disposed transversely with respect to the vibration sensitive elements of said microphone, each of said individual receiver units including a diaphragm and diaphragm actuator and having its respective diaphragm in communication with said plenum chamber, said diaphragm actuators being so electrically connected with respect to their polar characteristics that when the diaphragm actuators of each individual receiver unit are connected to the same source of fluctuating electric potential the respective diaphragms are caused to move in phase relation with respect to each other alternately compressing and rarefying the fluid in said plenum chamber.

3. An audiphone according to claim 2 in which the receiver body is resiliently mounted in said casing, the resilient supports comprising said resilient mounting lying in a plane passing through the center of gravity of said receiver body and associated elements.

4. An audiphone according to claim 2 in which the receiver body is resiliently mounted in said casing and in which the receiver body and its associated individual receiver elements are supported out of any contact with said casing except through said resilient mounting.

5. An audiphone according to claim 2 in which the receiver body is resiliently mounted in said casing, the resilient supports comprising said resilient mounting lying in a plane passing through the axes of said air passage.

6. In a hearing aid, a compartmented casing, a microphone mounted in one of said compartments, a receiver body mounted in another of said compartments, a plenum chamber in said receiver body, said plenum chamber having two open sides and an exhaust opening through which the interior of said chamber is placed in communication with the exterior of said casing, and a partition within said plenum chamber substantially dividing said chamber into two parts, said partition being so formed as to concentrate any movements of fluid within said chamber at a point near said exhaust opening, a pair of individual receiver units mounted on said receiver body in spaced position with respect to each other and mounted transversely with respect to the vibration sensitive elements of said microphone, each of said individual receiver units including a diaphragm and diaphragm actuator, one of the diaphragms of each of said units being placed over one of the openings in said plenum chamber and having its edges secured to said receiver body to close said openings, said diaphragm actuators being so electrically connected with respect to their polar characteristics that when the diaphragm actuators of each individual receiver unit are subjected to the same source of fluctuating electric potential the respective diaphragms are caused to move in phase relation with respect to each other to alternately compress and rarefy the fluid in said plenum chamber, an air passage extending from the outside of said casing into said plenum chamber through which said pulsations of fluid can be conducted to the ear of a user and means within said plenum chamber for concentrating said fluid pulsations caused by the movement of said diaphragm at the point of entrance of said fluid passage into said plenum chamber.

7. In an audiphone, a compartmented casing, a transmitter supported in one of said compartments, a receiver body supported in another of said compartments, a yielding support for said receiver body to permit slight relative movement between said receiver body and said casing, a plenum chamber in said receiver body having an opening on either side thereof, individual receiver units mounted on each side of said receiver body and transverse to said transmitter, said individual receiver units comprising each a diaphragm and a crystal actuator, each of said diaphragms covering one of said openings in said plenum chamber, projections on said receiver body adjacent said openings for mounting said crystal actuators, and a sound tube extending through said casing and one edge of said receiver body and into said plenum chamber to provide a fluid passage from the interior of said plenum chamber to the exterior of said casing.

8. An audiphone according to claim 7 in which the yielding support comprises a flat ring formed of resilient material, said ring extending substantially around the edge of said receiver body and supporting said receiver body in spaced relation with respect to the interior of said casing.

9. An audiphone according to claim 7 in which the yielding support comprises a flat ring formed of resilient material and in which said receiver body is provided with a channel extending around its peripheral edge into which the inner edge of said ring is inserted and the interior of said casing is provided with a channel into which the outer edge of said ring is inserted to support said receiver body in spaced relation with respect to said casing.

10. An audiphone according to claim 7 in which said plenum chamber is formed as a separate member from said receiver body, which member is supported within said receiver body.

11. In an audiphone, a compartmented casing, microphone elements supported within one of said compartments, a receiver body, means supporting said receiver body in another of said compartments in spaced relation with respect to the interior of said casing, a yielding support for said receiver body to permit slight relative movement between said receiver body and said casing, a plenum chamber in said receiver body having an opening on either side thereof, a sound tube extending from said plenum chamber through said receiver body and said casing to provide communication with said plenum chamber from outside of said casing, said sound tube being disposed at right angles to said plenum chamber and receiver body and communicating with said plenum chamber at a point near the center thereof, individual receiver units mounted on each side of said receiver body and transverse to said microphone elements, each of said individual receiver units comprising a diaphragm and a crystal actuator for said diaphragm, each of said diaphragms covering one of said openings in said plenum chamber, and projections on said receiver body adjacent said openings for mounting said crystal actuators.

12. An audiphone according to claim 11 in which the projections for mounting the crystal actuators, the crystal actuators and the diaphragms are disposed on opposing sides of said receiver body, one of said individual receivers and its associated elements being substantially the mirror image of the other of said individual receivers and its associated elements.

13. An audiphone according to claim 11 in which the said individual receivers and components thereof are disposed on opposing sides of said receiver-body and turned 180° with respect to each other, the projections for mounting the crystal actuators of said respective receivers lying on opposite sides of the axis of said sound tube.

14. In a hearing aid, a compartmented casing, a microphone including vibration sensitive elements mounted in one of the compartments of said casing, a receiver body mounted in another of the compartments of said casing, said receiver body being disposed transversely with respect to the vibration sensitive elements of said microphone, a plenum chamber in said receiver body having an opening on either side thereof, a sound tube secured to said receiver body and extending from said plenum chamber through said receiver body and into an air passage extending through said casing to provide communication with said plenum chamber from outside of said casing, said sound tube being disposed at right angles to said plenum chamber and said receiver body and communicating with a point near the center of said plenum chamber, a shaft extending from the opposite side of said receiver body to that of the said sound tube and having an axis in line with the axis of said sound tube, said sound tube and said shaft supporting said receiver body in said casing, means in said casing for supporting said shaft, and resilient material disposed between said sound tube and said casing and between said shaft and said supporting means for said shaft to provide a resilient support for said receiver body, and individual receiver units mounted on each side of said receiver body comprising a diaphragm and a crystal actuator, each of said diaphragms covering one of said openings in said plenum chamber.

REGINALD B. BLAND.

REFERENCES CITED

The following references are of record in the file of this patent:

10

UNITED STATES PATENTS

| Number | Name | Date |
|---|---|---|
| 344,333 | Turnbull | June 28, 1886 |
| 517,763 | McKelvey | Apr. 3, 1894 |
| 1,227,030 | Barber | May 22, 1917 |
| 1,697,659 | Du Perow | Jan. 1, 1929 |
| 2,306,707 | Mason | Dec. 29, 1942 |
| 2,327,136 | Shapiro | Aug. 17, 1943 |
| 2,375,010 | Lybarger | May 1, 1945 |
| 2,417,153 | Darr | Mar. 11, 1947 |
| 2,485,405 | Olney et al. | Oct. 18, 1949 |

FOREIGN PATENTS

| Number | Country | Date |
|---|---|---|
| 1,081 | Great Britain | Jan. 15, 1904 |
| 23,532 | Sweden | June 14, 1907 |
| 241,343 | Great Britain | Oct. 22, 1925 |
| 253,503 | Great Britain | Sept. 21, 1927 |